US011190130B2

United States Patent
Yamaai et al.

(10) Patent No.: US 11,190,130 B2
(45) Date of Patent: Nov. 30, 2021

(54) POWER WIRING APPARATUS

(71) Applicant: ZEON CORPORATION, Tokyo (JP)

(72) Inventors: Midori Yamaai, Tokyo (JP);
Masayoshi Yoshida, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/977,811

(22) PCT Filed: Mar. 7, 2019

(86) PCT No.: PCT/JP2019/009109
§ 371 (c)(1),
(2) Date: Sep. 3, 2020

(87) PCT Pub. No.: WO2019/181536
PCT Pub. Date: Sep. 26, 2019

(65) Prior Publication Data
US 2020/0403566 A1 Dec. 24, 2020

(30) Foreign Application Priority Data
Mar. 22, 2018 (JP) .............................. JP2018-055219

(51) Int. Cl.
H02S 40/36 (2014.01)
H02S 10/40 (2014.01)
(Continued)

(52) U.S. Cl.
CPC ............... *H02S 40/36* (2014.12); *H02S 10/40* (2014.12); *H02S 30/20* (2014.12); *H02S 40/34* (2014.12); *H02J 7/35* (2013.01)

(58) Field of Classification Search
CPC .......... H02S 40/36; H02S 10/40; H02S 30/20; H02S 40/34; H02J 7/35
See application file for complete search history.

(56) References Cited

U.S. PATENT DOCUMENTS

| 5,701,067 A | 12/1997 | Kaji et al. |
| 2018/0097469 A1 | 4/2018 | Yoshida et al. |
| 2018/0241342 A1 | 8/2018 | Yoshida et al. |

FOREIGN PATENT DOCUMENTS

| JP | H08237883 A | 9/1996 |
| JP | H0951118 A | 2/1997 |

(Continued)

OTHER PUBLICATIONS

Sep. 22, 2020, International Preliminary Reporton Patentability issued in the International Patent Application No. PCT/JP2019/009109.

(Continued)

*Primary Examiner* — Robert L Deberadinis
(74) *Attorney, Agent, or Firm* — Kenja IP Law PC

(57) ABSTRACT

The present disclosure aims to provide a power wiring apparatus that has improved portability and convenience. A power wiring apparatus of the present disclosure includes a plate-shaped wiring member, which includes a plurality of first connectors and is configured to conductively connect the plurality of first connectors to each other, and a plate-shaped external circuit element mounted on the wiring member and including a second connector mechanically and electrically attachable to and detachable from any first connector among the plurality of first connectors. The insertion and removal direction of the second connector with respect to the first connector is substantially parallel to the surface direction of the external circuit element. The external circuit element includes an energy harvesting element as a circuit element capable of outputting, from the second connector, power generated by energy harvesting.

20 Claims, 11 Drawing Sheets

(51) Int. Cl.
  *H02S 30/20*    (2014.01)
  *H02S 40/34*    (2014.01)
  *H02J 7/35*     (2006.01)

(56) References Cited

FOREIGN PATENT DOCUMENTS

WO    2016152084 A1    9/2016
WO    2016152086 A1    9/2016

OTHER PUBLICATIONS

Jun. 4, 2019, International Search Report issued in the International Patent Application No. PCT/JP2019/009109.

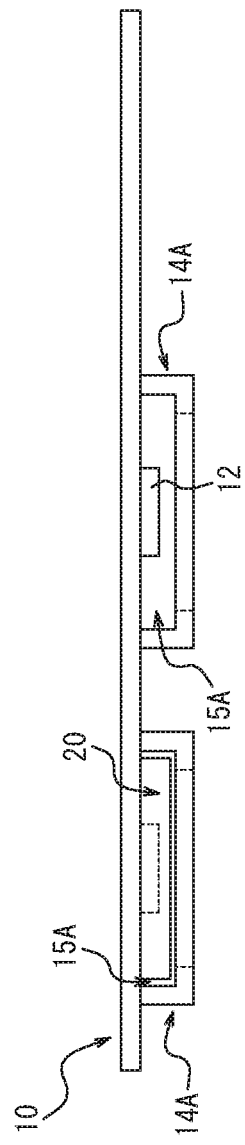

POWER WIRING APPARATUS

CROSS-REFERENCE TO RELATED APPLICATION

The present application claims priority to and the benefit of Japanese Patent Application No. 2018-55219 filed Mar. 22, 2018, the entire contents of which are incorporated herein by reference.

TECHNICAL FIELD

The present disclosure relates to a power wiring apparatus.

BACKGROUND

In recent years, demand has increased for a portable energy harvester that generates power in accordance with an external environment to supply power for a load such as a smartphone, laptop personal computer (PC), tablet PC, or other portable electronic device at locations where no commercial power supply is available, for example when a user is out. Examples of energy harvesters include an apparatus provided with a solar cell that generates power using light energy from sunlight or the like and an apparatus provided with a thermoelectric conversion element that generates power using thermal energy such as geothermal energy.

As an example of such an energy harvester, patent literature (PTL) 1 discloses a sheet solar cell that is easier to transport and store by virtue of being bendable.

CITATION LIST

Patent Literature

PTL 1: JP H9-51118 A
PTL 2: JP H8-237883 A

SUMMARY

Technical Problem

In PTL 1, however, sheet solar cells are combined into a module in a state in which the solar cells cannot be detached from each other. This prevents adjustment of the number of solar cells in accordance with usage conditions, replacement of a portion of sheet solar cells upon failure, or connection of individual sheet solar cells to other apparatuses as necessary.

In this regard, PTL 2 discloses a battery charger capable of engaging with a solar cell that hooks onto wiring.

In PTL 2, however, the surface direction of the solar cell and the attachment direction of the solar cell differ. This leads to bending stress or the like when the solar cell is attached or detached, making the solar cell prone to damage and making highly reliable attachment and detachment cumbersome.

The present disclosure therefore aims to resolve these problems by providing a power wiring apparatus that has improved portability and/or improved convenience.

Solution to Problem

The present disclosure aims to resolve the aforementioned problem advantageously. A power wiring apparatus of the present disclosure includes a plate-shaped wiring member, which includes a plurality of first connectors and is configured to conductively connect the plurality of first connectors to each other, and a plate-shaped external circuit element mounted on the wiring member and including a second connector mechanically and electrically attachable to and detachable from any first connector among the plurality of first connectors. The insertion and removal direction of the second connector with respect to the first connector is substantially parallel to the surface direction of the external circuit element. The external circuit element includes an energy harvesting element as a circuit element capable of outputting, from the second connector, power generated by energy harvesting. This configuration enables the external circuit element with the energy harvesting element mounted thereon to be carried while attached to the wiring member. This enables the power wiring apparatus to be moved to a location with high power generation efficiency, thereby suppressing a reduction in power generation efficiency due to the external environment.

In the power wiring apparatus of the present disclosure with the above configuration, the wiring member is preferably flexible. This configuration allows the power wiring apparatus to be deformed for easier storage and carrying.

In the power wiring apparatus of the present disclosure with the above configuration, the wiring member preferably includes an edge holding member configured to hold the external circuit element on the wiring member by restricting displacement of the external circuit element in a thickness direction at an edge of the external circuit element. This configuration enables the external circuit element to be held without separating from the wiring member. When the power wiring apparatus is carried with the external circuit element attached to the wiring member, this configuration can therefore prevent the external circuit element from separating from the wiring member and deforming and can suppress damage caused by excessive stress.

In the power wiring apparatus of the present disclosure with the above configuration, the edge holding member preferably includes a housing configured to house the edge along the insertion and removal direction of the second connector, and the second connector is preferably positioned to be attachable to the first connector by the edge being housed in the housing with the second connector facing the first connector. This configuration enables the external circuit element to be moved in parallel with the wiring member to attach the second connector to the first connector easily. Furthermore, the stress on each member when the second connector is attached to the first connector can be reduced.

In the power wiring apparatus of the present disclosure with the above configuration, the external circuit element preferably includes a load element as a circuit element capable of consuming power inputted from the second connector. This configuration enables the power generated by the energy harvesting element in the power wiring apparatus to be consumed by the load element. Furthermore, the load element and the energy harvesting element can be integrated and easily carried in the same arrangement as the arrangement during or after use. The arrangement can also be freely changed by attachment and detachment via the connector.

In the power wiring apparatus of the present disclosure with the above configuration, the wiring member preferably includes a plurality of wiring member units configured to include the first connector, and the plurality of wiring member units are preferably mechanically and electrically connected via a connection wiring member. This configuration enables the power wiring apparatus to be folded in the area of the connection wiring member, making the power wiring apparatus easier to store and carry.

In the power wiring apparatus of the present disclosure with the above configuration, the connection wiring member preferably includes fourth connectors disposed on the plurality of wiring member units, and the plurality of wiring member units are preferably mechanically and electrically connected by the fourth connectors being connected to each other directly or via another member. This configuration enables the power wiring apparatus to be expanded by wiring member units, enabling the overall size of the power wiring apparatus to be freely adjusted in accordance with the user's usage conditions or the like.

In the power wiring apparatus of the present disclosure with the above configuration, the wiring member is preferably bendable at a bending position where the external circuit element is not disposed. This configuration enables the power wiring apparatus to be folded while the external circuit element is attached, thereby increasing the portability of the power wiring apparatus.

In the power wiring apparatus of the present disclosure with the above configuration, two first connectors adjacent to the bending position are preferably disposed at in-plane positions that do not overlap each other in the surface direction when the wiring member is bent at the bending position. This configuration can reduce the thickness in the direction of overlap when the power wiring apparatus is bent, thereby further increasing the portability of the power wiring apparatus.

Advantageous Effect

The present disclosure can provide a power wiring apparatus that has improved portability and/or improved convenience.

BRIEF DESCRIPTION OF THE DRAWINGS

In the accompanying drawings:

FIG. 1A is a rear view of the configuration of a power wiring apparatus 1 according to an embodiment of the present disclosure;

DETAILED DESCRIPTION

Embodiments of the present disclosure are described below with reference to the drawings. Common components in each drawing are labeled with the same reference sign.

[Configuration of Power Wiring Apparatus 1]

Figure 1B:
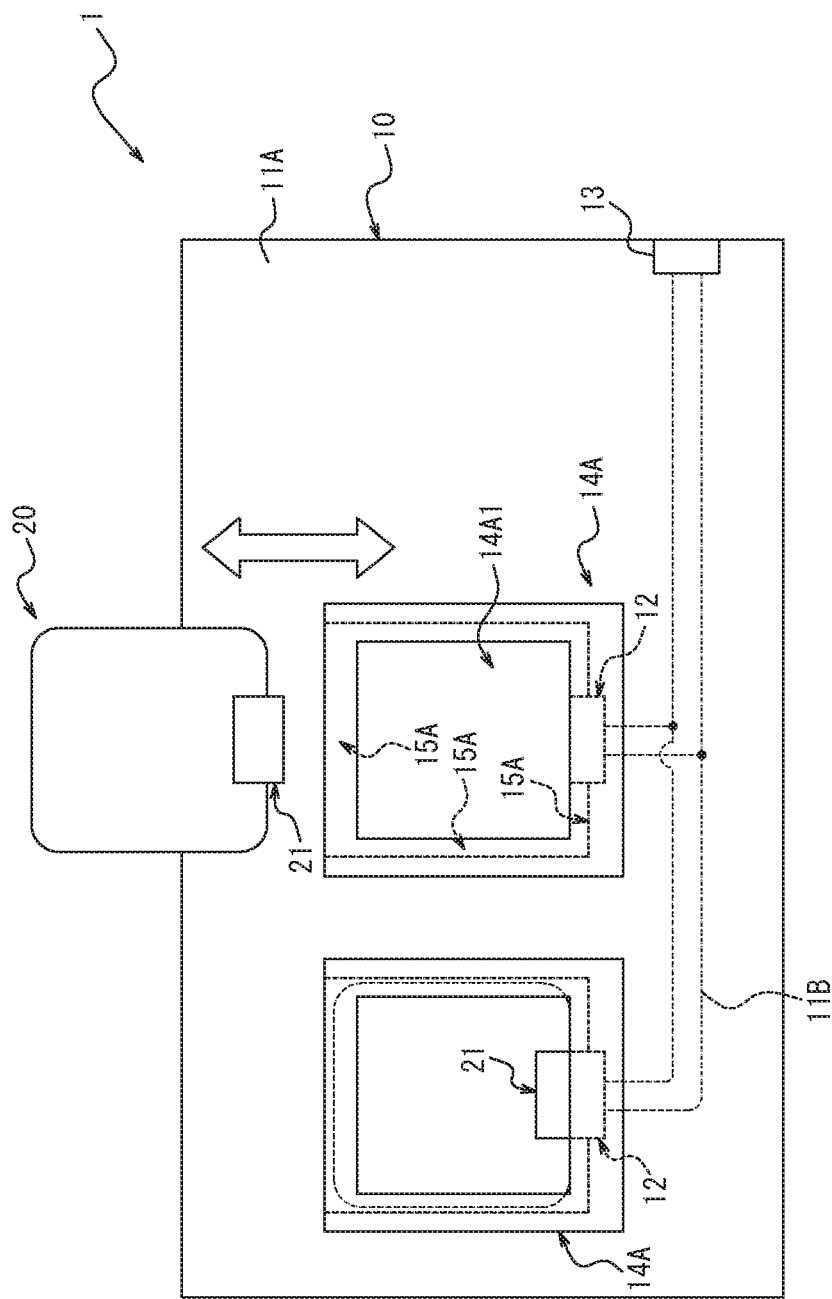
FIG. 1B is a plan view of the configuration of the power wiring apparatus 1 according to an embodiment of the present disclosure.

FIGS. 1A, 1B are schematic diagrams (a rear view and a plan view) of a power wiring apparatus 1 according to an embodiment of the present disclosure. As illustrated in FIG. 1B, the power wiring apparatus 1 includes a wiring member 10 and external circuit elements 20. The wiring member 10 is formed to have a plate-like planar shape, as illustrated in FIGS. 1A, 1B, and includes a plurality of first connectors 12. The power wiring apparatus 1 includes at least one energy harvesting element inside at least any one of the external circuit elements 20. The external circuit element 20 is formed to be plate-like and includes a second connector 21 mechanically and electrically attachable to and detachable from any first connector 12 among the plurality of first connectors 12 provided in the wiring member 10. The plurality of first connectors 12 are connected to each other electrically by a conductive portion 11B, and the external circuit elements 20 attached to the plurality of first connectors 12 are connected to each other electrically by the conductive portion 11B. In FIGS. 1A, 1B, the shape of each component in the power wiring apparatus 1 is prescribed for the sake of explanation, but the actual shapes of components are not limited to these shapes. This also applies to each of the drawings described below.

In the present embodiment, the surface direction of the wiring member 10 and the external circuit element 20 refers to the direction parallel to the paper in FIG. 1B, and the thickness direction of the wiring member 10 and the external circuit element 20 refers to the direction perpendicular to the paper in FIG. 1B. The upper surface of the wiring member 10 and the external circuit element 20 indicates the surface visible in the plan view of FIG. 1B. In other words, the first connector 12 and an edge holding member 14A are provided on the upper surface of the wiring member 10. The left-right direction of the wiring member 10 and the external circuit element 20 is the left-right direction in FIG. 1B.

As illustrated in FIG. 1B, the wiring member 10 is provided with a board body 11A made of an insulating material, two first connectors 12, a conductive portion 11B electrically connecting the first connectors 12, an edge holding member 14A holding the edges of the external circuit element 20, and a third connector 13. The wiring member 10 according to the present embodiment is a planar member that has a rectangular shape in plan view. The wiring member 10 may include a covering, formed by an insulating material, that surrounds the conductive portion 11B. The wiring member 10 can be configured by a board that includes wiring as the conductive portion 11B. The board may be a rigid board, such as a glass epoxy board or paper phenol board, or a flexible printed circuit board made of polyimide film or the like. When a flexible printed circuit board is used in the wiring member 10, a reinforcing plate is preferably provided in the area where electronic components and members such as the edge holding members 14A to 14E, described below, are mounted. The reinforcing plate ensures the rigidity of the board body 11A. When a rigid board or a flexible board is used in the wiring member 10, the surface is preferably covered with a covering material, such as cloth or resin, from the perspective of design and resistance to the environment.

Electric current can flow in the extending direction of the conductive portion 11B. The conductive portion 11B includes an electrical conductor. Any electrical conductor may be included in the conductive portion 11B. Examples include conductors made of a metal material such as copper, aluminum, gold, silver, nickel, and iron and conductors made of an alloy material including these metal materials. The conductive portion 11B may have sufficient flexibility to bend back at any point in the extending direction or may be rigid. The conductive portion 11B preferably has flexibility to provide the wiring member 10 with a variable shape and improve the degree of design freedom of the power wiring apparatus 1 overall.

The two first connectors 12 are each connected to the conductive portion 11B. Accordingly, the two first connectors 12 are electrically connected to each other in a conductive manner via the conductive portion 11B. In the present embodiment, the two first connectors 12 are arranged at a distance from each other along the longitudinal direction (the left-right direction in FIG. 1B) of the wiring member 10. The third connector 13 may be provided at the edge of the wiring member 10 as illustrated in FIG. 1B. When the third connector 13 is provided on the wiring member 10, the two first connectors 12 along with the third connector 13 are electrically connected via the conductive portion 11B.

FIGS. 1A, 1B illustrate an example of the wiring member 10 including two first connectors 12, but it suffices for the wiring member 10 to include a plurality of first connectors 12. In other words, the wiring member 10 may include three or more first connectors 12. In this case, the plurality of first connectors 12 are conductively connected to each other. The plurality of first connectors 12 may be arranged at a distance from each other along the longitudinal direction of the wiring member 10 but are not limited to this configuration. The plurality of first connectors 12 may, for example, have the same shape.

The edge holding member 14A is provided in the area surrounding the external circuit element 20 in plan view of the wiring member 10, as illustrated in FIG. 1B. The edge holding member 14A includes a housing 15A that houses the edges of the external circuit element 20 along the insertion and removal direction of the second connector 21 (indicated by the arrow in FIG. 1B). The housing 15A is configured to cover the upper surface and side surfaces of the edges in the left-right direction of the external circuit element 20, as illustrated in FIG. 1A. Consequently, when the left and right edges of the external circuit element 20 are housed in the housing 15A with the second connector 21 facing the first connector 12 in plan view, the upper surface of the edges of the external circuit element 20 abuts against the edge holding member 14A, which restricts displacement of the external circuit element 20 in the thickness direction. Furthermore, the external circuit element 20 is positioned in the left-right direction relative to the edge holding member 14A by the left and right sides of the external circuit element 20 abutting against the edge holding member 14A. The second connector 21 is thus positioned to be attachable to the first connector 12. The edge of the external circuit element 20 is depicted as having been housed in the housing 15A of the edge holding member 14A at the left side of FIG. 1B, and the second connector 21 is depicted as having been attached to the first connector 12.

In the example illustrated in FIGS. 1A, 1B, the housing 15A extends not only over the area at the left and right edges of the external circuit element 20, but also over the area of the edges adjacent to the left and right of the first connector 12 and the area of the edge of the external circuit element 20 opposite the first connector 12. Accordingly, all four edges of the rectangular external circuit element 20 are housable in the housing 15A. The housing 15A at the insertion side when the external circuit element 20 is inserted in the edge holding member 14A (the upper side in FIG. 1B, i.e. the housing 15A at the side opposite the first connector 12), however, does not restrict the external circuit element 20 in the surface direction. The external circuit element 20 is insertable in the edge holding member 14A from the side opposite the first connector 12 in FIG. 1B. A rectangular opening 14A1 is formed at the central position of the edge holding member 14A in the surface direction, as illustrated in FIG. 1B. When a solar cell is mounted in the external circuit element 20 as an energy harvesting element, sunlight can strike the solar cell through the opening 14A1 for power to be generated.

Displacement of the external circuit element 20 in the thickness direction is reliably restricted by the housing 15A thus housing all four edges of the external circuit element 20, which is rectangular in plan view. Accordingly, even when the power wiring apparatus 1 is carried with the external circuit element 20 attached to the wiring member 10, the external circuit element 20 and the wiring member 10 can be stably held in a parallel state so that the external circuit element 20 does not separate from the upper surface of the wiring member 10. Furthermore, the external circuit element 20 is positioned in the left-right direction relative to the edge holding member 14A by the left and right sides of the external circuit element 20 abutting against the edge holding member 14A. The second connector 21 can therefore be positioned to be attachable to the first connector 12. When the edges of the external circuit element 20 are housed in the housing 15A of the edge holding member 14A in this way, the external circuit element 20 can be moved in parallel with the wiring member 10 for easy attachment of the second connector 21 to the first connector 12. Furthermore, the stress on each member when the second connector 21 is attached to the first connector 12 can be reduced.

In the present embodiment, the external circuit element 20 has a rectangular shape in plan view, but this example is not limiting. It suffices for at least a portion of the left and right edges of the external circuit element 20 to be linear. The reason is that housing this linear portion in the edge holding member 14A enables the second connector 21 to be positioned relative to the first connector 12 and mounted while the external circuit element 20 is maintained parallel to the wiring member 10. When only the effect of restricting displacement of the external circuit element 20 in the thickness direction relative to the wiring member 10 is obtained, the shape of the external circuit element 20 need not have a linear portion on the edges and may instead have a shape formed only by curves, such as a circle. The shape of the housing 15A of the edge holding member 14A may also be curved as appropriate in correspondence with the shape of the edges of the external circuit element 20.

The wiring member 10 (board body 11A) need not be disposed over the entire area where the external circuit element 20 is mounted on the wiring member 10. To reduce weight, the wiring member 10 (board body 11A) may be disposed only in the portion for supporting the external circuit element 20, such as the portion in contact with the perimeter of the external circuit element 20.

As illustrated in FIG. 1B, the external circuit element 20 includes the second connector 21. In FIG. 1B, the second connector 21 of an external circuit element 20 has been attached to the first connector 12 on the left, and the second connector 21 of an external circuit element 20 is about to be attached to the first connector 12 on the right. The second connector 21 in the example illustrated in FIG. 1B is provided on an edge of the external circuit element 20. When the central position in the thickness direction in the portion of the second connector 21 that abuts against the first connector 12 substantially matches the central position in the thickness direction at the edge of the external circuit element 20 where the second connector 21 is disposed, excessive stress can be suppressed, such as bending stress upon insertion or removal, making this configuration preferable. In the present embodiment, the insertion and removal direction of the second connector 21 relative to the first connector 12 is the up-down direction in FIGS. 1B and 1*s* parallel to the surface direction of the external circuit element 20. Consequently, the external circuit element 20 does not project in the thickness direction when attached or detached, enabling a reduction in the thickness of the power wiring apparatus 1 that takes into account attachment and detachment of the external circuit element 20. Furthermore, when the external circuit element 20 is attached or detached, it suffices to exert a force in the surface direction of the external circuit element 20. This configuration can suppress an excessive stress, such as bending stress, on each member. In the example in FIG. 1B, the insertion and removal direction of the second connector 21 relative to the first connector 12 is also parallel to the surface direction of the wiring member 10.

The external circuit element 20 can, for example, include an energy harvesting element. The energy harvesting element is capable of outputting, from the second connector 21, power generated by energy harvesting. When a plurality of external circuit elements 20 that include an energy harvesting element is attached to the wiring member 10, the power generation capability of each of a plurality of energy harvesting elements may differ.

In the present embodiment, at least one external circuit element 20 between the two external circuit elements 20 connected to the two first connectors 12 of FIG. 1B includes an energy harvesting element. Consequently, power generated by energy harvesting can be outputted from the second connector 21, and power can be supplied to a load element connected to the wiring member 10.

The second connector 21 is mechanically and electrically attachable to and detachable from any of the first connectors 12 included in the wiring member 10. In the present disclosure, stating that two connectors are "mechanically and electrically attachable and detachable" refers to one of the connectors being attachable to the other connector and being detachable after attachment. In a state in which one connector is attached to the other connector, the two connectors are mechanically and electrically connected to each other. In a state in which one connector is detached from the other connector, the two connectors are mechanically and electrically disconnected from each other.

The energy harvesting element mounted in the external circuit element 20 can, for example, be configured to include an energy harvesting unit (not illustrated), capable of generating power by energy harvesting, and a reverse current prevention unit (not illustrated). In this case, the energy harvesting unit generates power in accordance with the external environment and includes a solar cell, for example, that generates power using light energy such as sunlight or room light. Alternatively, the energy harvesting unit may include a thermoelectric conversion element that generates power using thermal energy such as geothermal energy. The energy harvesting unit outputs the generated power to the second connector 21 via the reverse current prevention unit.

The types of solar cells mountable in the energy harvesting element are roughly classified into inorganic solar cells in which an inorganic material is used and organic solar cells in which an organic material is used. Examples of inorganic solar cells include silicon (Si) solar cells in which silicon is used and compound solar cells in which a compound is used. Examples of organic solar cells include thin-film solar cells such as low-molecular weight vapor deposition-type solar cells in which an organic pigment is used, polymer coating-type solar cells in which a conductive polymer is used, and coating-conversion-type solar cells in which a conversion-type semiconductor is used; and dye-sensitized solar cells formed from titania, an organic dye, and an electrolyte. Solar cells included in a solar cell panel can also include organic/inorganic hybrid solar cells and solar cells in which a perovskite compound is used. The solar cell panel may be a thin panel. In this case, it is preferable to use a dye-sensitized solar cell, fabricated on a plastic film or the like, which is easy to form as a thin mold. When the solar cell panel is a thin panel, the solar cell panel is not limited to one fabricated on a plastic film or the like; any mode is applicable as long as it is similarly thin. The thickness of the solar cell panel formed as a thin panel is preferably 10 μm or more to 3 mm or less, for example, from the perspective of manufacturing techniques.

The reverse current prevention unit prevents current from the second connector 21 from flowing into the energy harvesting unit. The reverse current prevention unit can include a circuit element such as a diode. When a diode is used as the reverse current prevention unit, the diode is connected so that the anode is on the energy harvesting unit side, and the cathode is on the second connector 21 side. The collector and the base terminals of a transistor may be connected and paired with the emitter for use as a diode in the reverse current prevention unit.

The energy harvesting unit may be an energy harvesting unit included in another circuit element connected via the external circuit element 20.

Instead of or in addition to the energy harvesting element, the external circuit element 20 can include a load element. The load element is capable of consuming power inputted from the second connector 21. In FIG. 1B, one external circuit element 20 of the two external circuit elements 20 attached via the two first connectors 12 may include an energy harvesting element, whereas the other external circuit element 20 may include a load element. At least one of the external circuit elements 20 may include a load element together with an energy harvesting element. To supplement the power from the energy harvesting element, the external circuit element 20 may include a charged secondary battery element, described below, or may be configured to supply auxiliary power to the load element from another apparatus via the third connector 13. When a plurality of load elements is included in the external circuit element 20, the power consumption of each load element may differ.

When a load element is mounted in the external circuit element 20, the external circuit element 20 can include a load and a voltage controller in addition to the second connector 21. The second connector 21 and the voltage controller are electrically connected to each other directly or via electrical wiring. The voltage controller and the load are electrically connected to each other directly or via electrical wiring.

The load may be any load capable of consuming power. Examples of the load include an electronic device, such as a radio or speaker; LED lighting; and an electronic toy. The power consumed by the load may change depending on factors such as the drive state of the load.

The voltage controller controls the power inputted from the second connector 21 to be a predetermined voltage and outputs the result to the load. In greater detail, the voltage controller steps down or steps up the power inputted from the second connector 21 to a predetermined voltage suitable for driving the load, such as the rated voltage of the load, and outputs the result to the load.

The load may be a load included in another circuit element connected via the external circuit element 20, such as a smartphone, mobile phone, personal computer, or other typical electronic device.

The power wiring apparatus 1 may further include a secondary battery element as a circuit element. When the external circuit element 20 includes a secondary battery element, the external circuit element 20 can include a secondary battery, a switch, a voltage controller, and a reverse current prevention unit, for example, in addition to the above-described second connector 21.

The secondary battery is capable of being charged and discharged. Examples of the secondary battery include a lithium ion battery and a nickel-hydrogen battery.

The switch is capable of switching between a charging state of charging the secondary battery with power inputted from the second connector 21 and a power supply state of outputting, from the second connector 21, power from the secondary battery. The switch includes a switching element, for example, electrically connected between the second connector 21 and the secondary battery.

The voltage controller controls the power inputted from the second connector 21 to be a predetermined voltage and outputs the result to the secondary battery. In greater detail, the voltage controller steps down or steps up the power inputted from the second connector 21 to a predetermined voltage suitable for charging the secondary battery, such as the rated voltage of the secondary battery, and outputs the result to the secondary battery. The voltage controller also controls the power inputted from the secondary battery to be a predetermined voltage and outputs the result to the second connector 21. In greater detail, the voltage controller steps down or steps up the power inputted from the secondary battery to a predetermined voltage suitable for another circuit element, such as a load element, and outputs the result to the second connector 21.

When the switch is in the power supply state, the reverse current prevention unit suppresses current from the second connector 21 from flowing into the secondary battery. The reverse current prevention unit can include a circuit element such as a diode. When a diode is used as the reverse current prevention unit, the diode is connected so that the anode is on the secondary battery side, and the cathode is on the second connector 21 side.

When the external circuit element 20 includes a secondary battery element in this way, power can be supplied to the load element stably by switching between the charging state and the power supply state of the secondary battery element depending on conditions. For example, the secondary battery element may be placed in the power supply state when power supply to the load element is insufficient and be placed in the charging state when power supply to the load element is sufficient.

Figure 2:
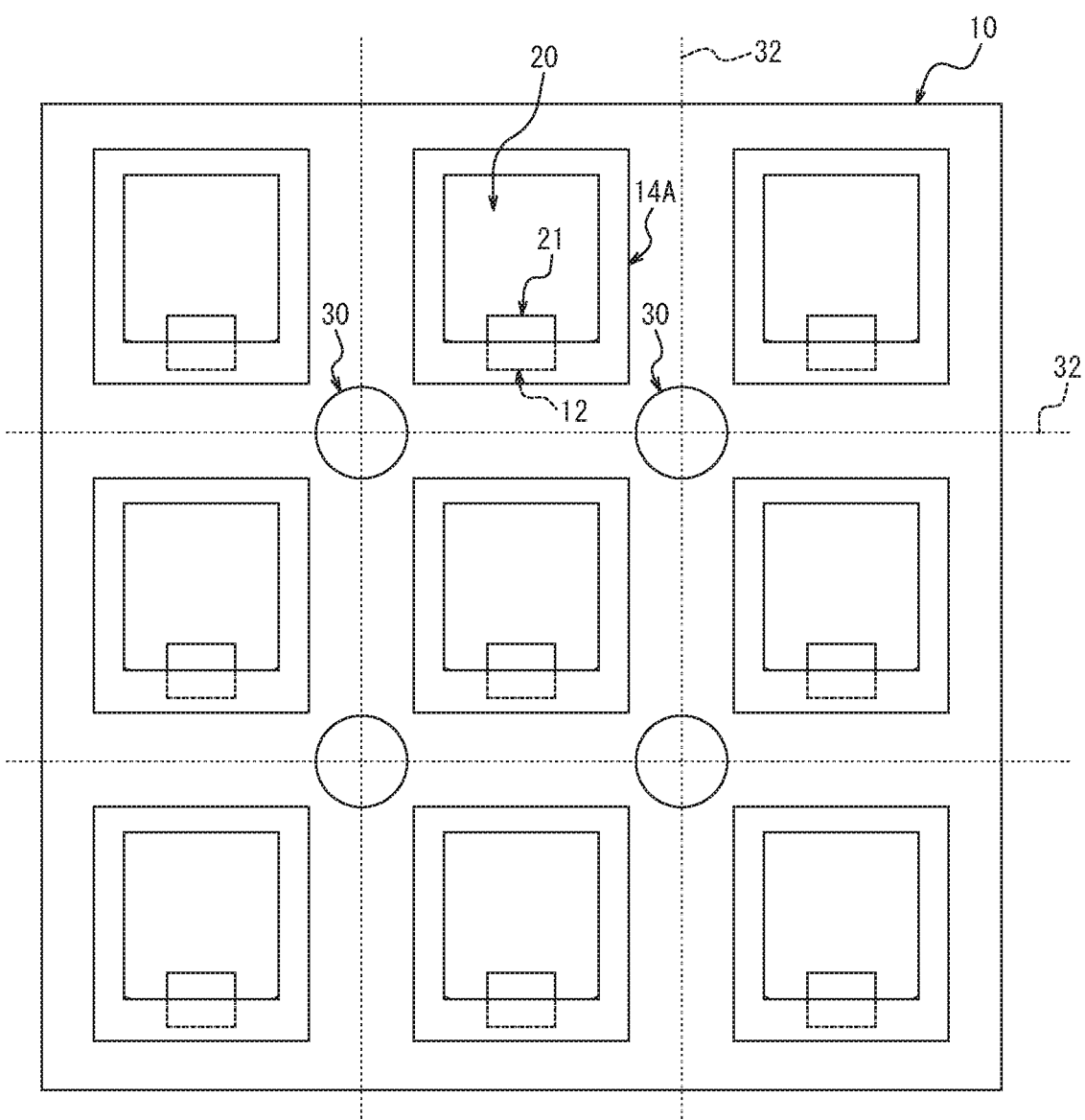
FIG. 2 is a plan view of a modification to the power wiring apparatus 1 according to an embodiment of the present disclosure.

The wiring member 10 may be any shape, such as rectangular, substantially circular, substantially elliptical, or the like. Furthermore, when external circuit elements 20 are arranged in a grid as illustrated in FIG. 2, holes 30 may be formed in the wiring member 10 at the intersections of vertical and horizontal folding lines 32 when the wiring member 10 is folded. The holes 30 can suppress damage to the wiring member 10 due to a load on the intersections at the time of folding.

Figure 3:
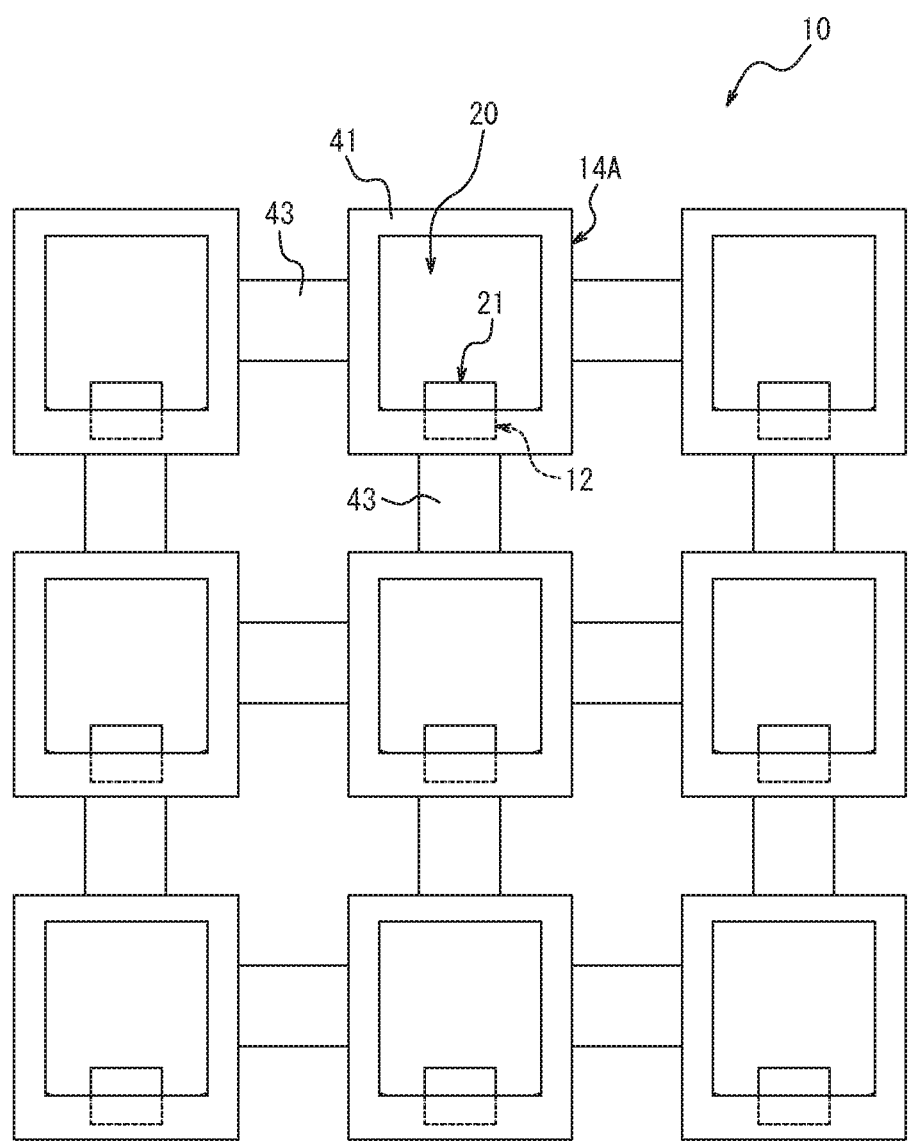
FIG. 3 is a plan view of another modification to the power wiring apparatus 1 according to an embodiment of the present disclosure.

As illustrated in FIG. 3, a mounting area 41 for mounting the external circuit element 20 and a connection area 43 (connection wiring member), which connects adjacent mounting areas 41, may be included in the wiring member 10 with individually recognizable shapes and each be formed as one member.

In the present embodiment, the wiring member 10 has a planar shape, but this configuration is not limiting. The wiring member 10 need not be flat. In the example illustrated in FIGS. 1A, 1B, the wiring member 10 is configured as one member, but this configuration is not limiting. The wiring member 10 may be configured by connecting a plurality of wiring member units with a connection wiring member, as described below.

[Configuration of Power Wiring Apparatus 2]

Figure 4A:
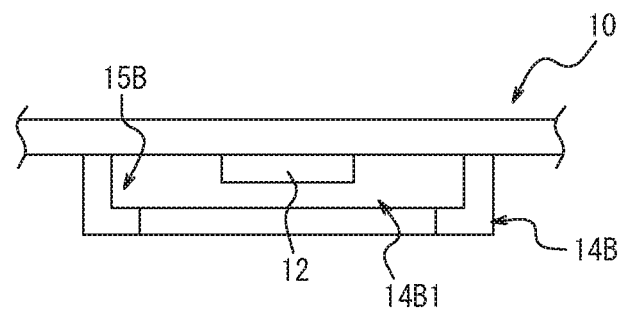
FIG. 4A is a partial rear view of the configuration of a power wiring apparatus 2 according to an embodiment of the present disclosure.
Figure 4B:
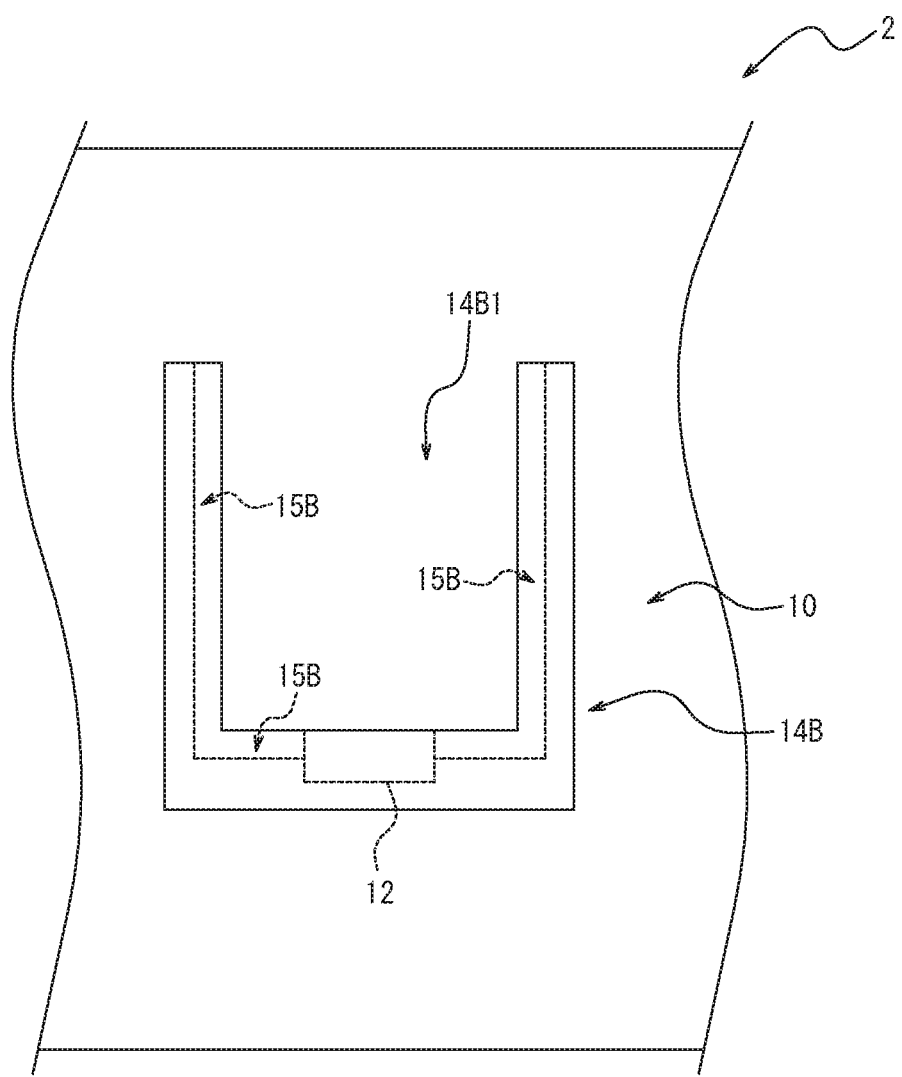
FIG. 4B is a partial plan view of the configuration of the power wiring apparatus 2 according to an embodiment of the present disclosure.

FIGS. 4A, 4B are schematic diagrams (a rear view and a plan view) of a power wiring apparatus 2 according to an embodiment of the present disclosure. The power wiring apparatus 2 is a modification to the power wiring apparatus 1 illustrated in FIGS. 1A, 1B and has a configuration close to that of the power wiring apparatus 1, except that the configuration of an edge holding member 14B differs from that of the edge holding member 14A of the power wiring apparatus 1. Accordingly, the following description focuses on the configuration of the edge holding member 14B. Only one first connector 12 and edge holding member 14B are illustrated in FIGS. 4A, 4B to describe the configuration of the edge holding member 14B, which is the difference from the power wiring apparatus 1, in detail. It should be noted, however, that like the power wiring apparatus 1, the power wiring apparatus 2 also includes a plurality of first connectors 12 and edge holding members 14B. The same applies to the power wiring apparatuses 3 to 8 below.

The edge holding member 14B is provided in the area surrounding the external circuit element 20 in plan view of the wiring member 10, as illustrated in FIG. 4B. The edge holding member 14B includes a housing 15B that houses the edges of the external circuit element 20 along the insertion and removal direction of the second connector 21 (the up-down direction in FIG. 4B). The housing 15B is configured to cover the upper surface and side surfaces of the edges in the left-right direction of the external circuit element 20, as illustrated in FIG. 4A. Consequently, when the left and right edges of the external circuit element 20 are housed in the housing 15B with the second connector 21 facing the first connector 12 in plan view, the upper surface of the edges of the external circuit element 20 abuts against the edge holding member 14B, which restricts displacement of the external circuit element 20 in the thickness direction.

Furthermore, the external circuit element 20 is positioned in the left-right direction relative to the edge holding member 14B by the left and right sides of the external circuit element 20 abutting against the edge holding member 14B. The second connector 21 is thus positioned to be attachable to the first connector 12. FIGS. 4A, 4B do not depict the external circuit element 20, but rather only the first connector 12 and the edge holding member 14B included in the wiring member 10.

In the example illustrated in FIGS. 4A, 4B, the housing 15B extends not only over the area at the left and right edges of the external circuit element 20, but also over the area of the edges adjacent to the left and right of the first connector 12. The housing 15B thereby surrounds the external circuit element 20 in all directions, except for the side opposite the first connector 12, i.e. the insertion slot for the external circuit element 20. Overall, the edge holding member 14B therefore has a U-shape that surrounds the external circuit element 20 from three directions.

The housing 15B is not formed in the edge holding member 14B at the side opposite the first connector 12 (the upper side in FIG. 4B), and the external circuit element 20 can be inserted into the edge holding member 14B from the upper side in FIG. 4B.

Guide grooves (not illustrated) into which the side surfaces of the external circuit element 20 are insertable may be formed on the left and right side surfaces of the edge holding member 14B that abut the external circuit element 20. The guide grooves guide the second connector 21 to facilitate insertion into and removal from the first connector 12 and relieve stress at the time of insertion or removal.

An opening 14B1 is formed at the central position of the edge holding member 14B in the surface direction, as illustrated in FIG. 4B. When a solar cell is mounted in the external circuit element 20 as an energy harvesting element, sunlight can strike the solar cell through the opening 14B1 for power to be generated.

Displacement of the external circuit element 20 in the thickness direction is reliably restricted by the housing 15B thus housing three edges of the external circuit element 20, which is rectangular in plan view. Accordingly, even when the power wiring apparatus 2 is carried with the external circuit element 20 attached to the wiring member 10, the external circuit element 20 and the wiring member 10 can be stably held in a parallel state so that the external circuit element 20 does not separate from the upper surface of the wiring member 10. Furthermore, the external circuit element 20 is positioned in the left-right direction relative to the edge holding member 14B by the left and right sides of the external circuit element 20 abutting against the edge holding member 14B. The second connector 21 can therefore be positioned to be attachable to the first connector 12. When the edges of the external circuit element 20 are housed in the housing 15B of the edge holding member 14B in this way, the external circuit element 20 can be moved in parallel with the wiring member 10 for easy attachment of the second connector 21 to the first connector 12. Furthermore, the stress on each member when the second connector 21 is attached to the first connector 12 can be reduced.

The edge holding member 14B does not hold all of the edges of the external circuit element 20 in this modification, unlike the power wiring apparatus 1. The power wiring apparatus 2 can therefore be reduced in weight to the extent that the edge holding member 14B is simplified.

[Configuration of Power Wiring Apparatus 3]

Figure 5A:
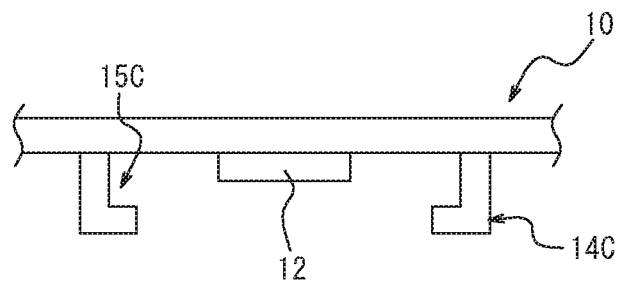
FIG. 5A is a partial rear view of the configuration of a power wiring apparatus 3 according to an embodiment of the present disclosure.
Figure 5B:
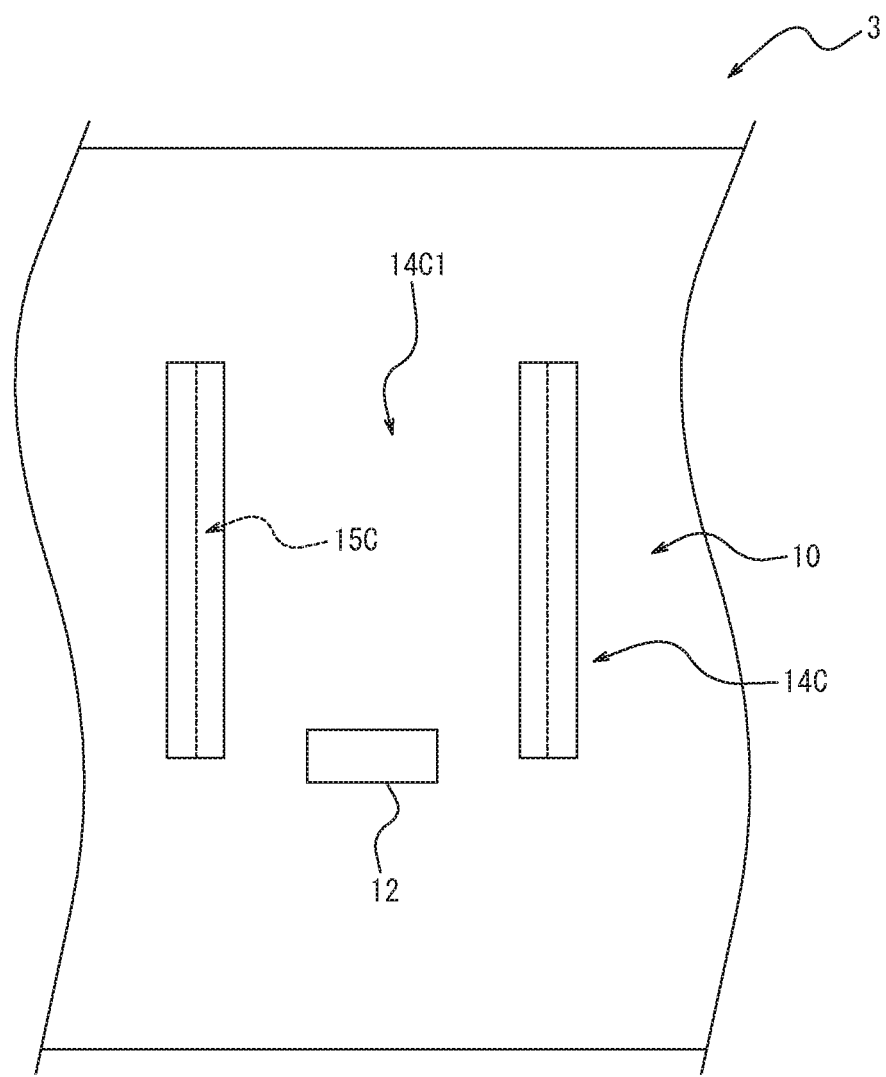
FIG. 5B is a partial plan view of the configuration of the power wiring apparatus 3 according to an embodiment of the present disclosure.

FIGS. 5A, 5B are schematic diagrams (a rear view and a plan view) of a power wiring apparatus 3 according to an embodiment of the present disclosure. The power wiring apparatus 3 is a modification to the power wiring apparatus 1 illustrated in FIGS. 1A, 1B and has a configuration close to that of the power wiring apparatus 1, except that the configuration of an edge holding member 14C differs from that of the edge holding member 14A of the power wiring apparatus 1. Accordingly, the following description focuses on the configuration of the edge holding member 14C.

The edge holding member 14C is provided in the area surrounding the external circuit element 20 in plan view of the wiring member 10, as illustrated in FIG. 5B. The edge holding member 14C includes a housing 15C that houses the edges of the external circuit element 20 along the insertion and removal direction of the second connector 21 (the up-down direction in FIG. 5B). The housing 15C is configured to cover the upper surface and side surfaces of the edges in the left-right direction of the external circuit element 20, as illustrated in FIG. 5A. Consequently, when the left and right edges of the external circuit element 20 are housed in the housing 15C with the second connector 21 facing the first connector 12 in plan view, the upper surface of the edges of the external circuit element 20 abuts against the edge holding member 14C, which restricts displacement of the external circuit element 20 in the thickness direction. Furthermore, the external circuit element 20 is positioned in the left-right direction relative to the edge holding member 14C by the left and right sides of the external circuit element 20 abutting against the edge holding member 14C. The second connector 21 is thus positioned to be attachable to the first connector 12. Like the power wiring apparatus 2, guide grooves may be provided on the inner side surfaces of the edge holding member 14C. FIGS. 5A, 5B do not depict the external circuit element 20, but rather only the first connector 12 and the edge holding member 14C included in the wiring member 10.

As illustrated in FIG. 5B, an opening 14C1 is formed in the area between the left-right pair of edge holding members 14C. When a solar cell is mounted in the external circuit element 20 as an energy harvesting element, sunlight can strike the solar cell through the opening 14C1 for power to be generated.

Displacement of the external circuit element 20 in the thickness direction is reliably restricted by the housing 15C thus housing two edges of the external circuit element 20, which is rectangular in plan view. Accordingly, even when the power wiring apparatus 3 is carried with the external circuit element 20 attached to the wiring member 10, the external circuit element 20 and the wiring member 10 can be stably held in a parallel state so that the external circuit element 20 does not separate from the upper surface of the wiring member 10. Furthermore, the external circuit element 20 is positioned in the left-right direction relative to the edge holding member 14C by the left and right sides of the external circuit element 20 abutting against the edge holding member 14C. The second connector 21 can therefore be positioned to be attachable to the first connector 12. When the edges of the external circuit element 20 are housed in the housing 15C of the edge holding member 14C in this way, the external circuit element 20 can be moved in parallel with the wiring member 10 for easy attachment of the second connector 21 to the first connector 12. Furthermore, the stress on each member when the second connector 21 is attached to the first connector 12 can be reduced.

The edge holding member 14C does not hold all of the edges of the external circuit element 20 in this modification, unlike the power wiring apparatus 1 or 2, but rather only holds the left and right sides. The power wiring apparatus 3 can therefore be further reduced in weight to the extent that the edge holding member 14C is simplified.

[Configuration of Power Wiring Apparatus 4]

Figure 6A:
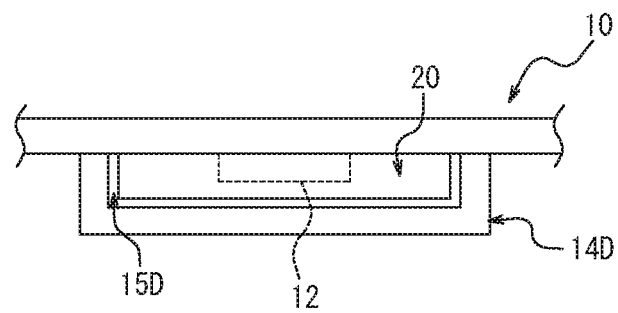
FIG. 6A is a partial rear view of the configuration of a power wiring apparatus 4 according to an embodiment of the present disclosure.
Figure 6B:
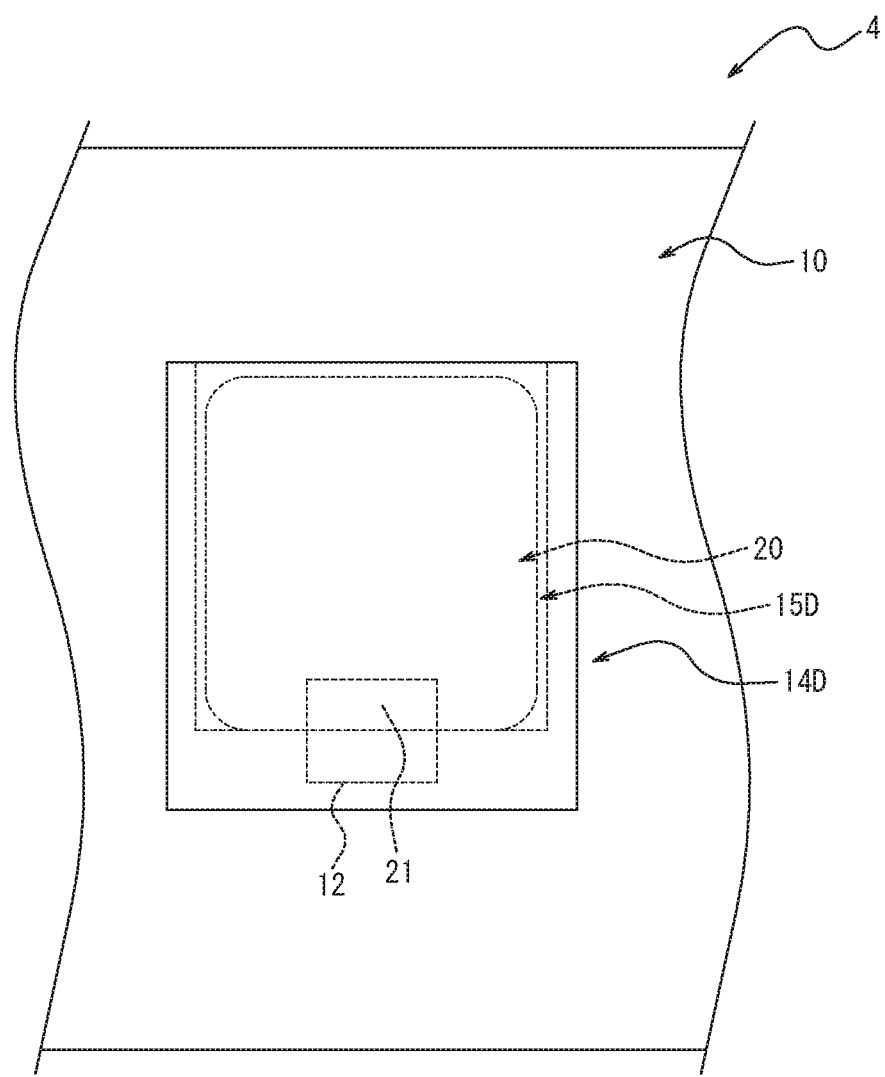
FIG. 6B is a partial plan view of the configuration of the power wiring apparatus 4 according to an embodiment of the present disclosure.

FIGS. 6A, 6B are schematic diagrams (a rear view and a plan view) of a power wiring apparatus 4 according to an embodiment of the present disclosure. The power wiring apparatus 4 is a modification to the power wiring apparatus 1 illustrated in FIGS. 1A, 1B and does not differ significantly from the power wiring apparatus 1, except that the configuration of an edge holding member 14D differs from that of the edge holding member 14A of the power wiring apparatus 1. Accordingly, the following description focuses on the configuration of the edge holding member 14D.

The edge holding member 14D is provided in the area surrounding the external circuit element 20 in plan view of the wiring member 10, as illustrated in FIG. 6B. The edge holding member 14D includes a housing 15D that is formed from transparent glass or resin and houses the edges of the external circuit element 20 along the insertion and removal direction of the second connector 21. The housing 15D is configured to cover the upper surface and side surfaces of the edges in the left-right direction of the external circuit element 20, as illustrated in FIG. 6A. Consequently, when the left and right edges of the external circuit element 20 are housed in the housing 15D with the second connector 21 facing the first connector 12 in plan view, the upper surface of the edges of the external circuit element 20 abuts against the edge holding member 14D, which restricts displacement of the external circuit element 20 in the thickness direction. Furthermore, the external circuit element 20 is positioned in the left-right direction relative to the edge holding member 14D by the left and right sides of the external circuit element 20 abutting against the edge holding member 14D. The second connector 21 is thus positioned to be attachable to the first connector 12.

In the example illustrated in FIGS. 6A, 6B, the housing 15D is configured to cover not only the area at the left and right edges of the external circuit element 20, but rather the entire area of the external circuit element 20. The edge holding member 14D in the power wiring apparatus 4 is formed by a transparent member. Hence, an opening need not be formed at the position struck by sunlight, and the entire external circuit element 20 can be housed in the housing 15D. Displacement of the external circuit element 20 in the thickness direction is therefore more reliably restricted, and the energy harvesting element or the like included in the external circuit element 20 can be protected from scratches, dirt, damage, or the like. Accordingly, even when the power wiring apparatus 4 is carried with the external circuit element 20 attached to the wiring member 10, the external circuit element 20 and the wiring member 10 can be stably held in a parallel state so that the external circuit element 20 does not separate from the upper surface of the wiring member 10, and the energy harvesting element or the like is less prone to scratches, dirt, damage, or the like. Furthermore, the external circuit element 20 is positioned in the left-right direction relative to the edge holding member 14D by the left and right sides of the external circuit element 20 abutting against the edge holding member 14D. The second connector 21 can therefore be positioned to be attachable to the first connector 12. When the edges of the external circuit element 20 are housed in the housing 15D of the edge holding member 14D in this way, the external circuit element 20 can be moved in parallel with the wiring member 10 for easy attachment of the second connector 21 to the first connector 12. Furthermore, the stress on each member when the second connector 21 is attached to the first connector 12 can be reduced.

The example in FIGS. 6A, 6B is configured so that the edge holding member 14D includes the substantially rectangular housing 15D, but this configuration is not limiting. It suffices for the housing 15D to be formed to a size that nearly immobilizes the external circuit element 20 therein so as to position the external circuit element 20.

When the external circuit element 20 includes a solar cell, then glass, or a sheet or film of sturdy transparent resin that is highly transmissive of sunlight and light-resistant, is preferably selected for the transparent member used in the edge holding member 14D of the power wiring apparatus 4. The edge holding member 14D may also be configured by combining different materials so that a transparent material is used only at the location where the power generator of the solar cell is exposed, and an opaque material, such as cloth or resin, is used around the location of exposure. Various materials, such as cloth or resin, may be used when the edge holding member 14D need not transmit sunlight.

[Configuration of Power Wiring Apparatus 5]

Figure 7:
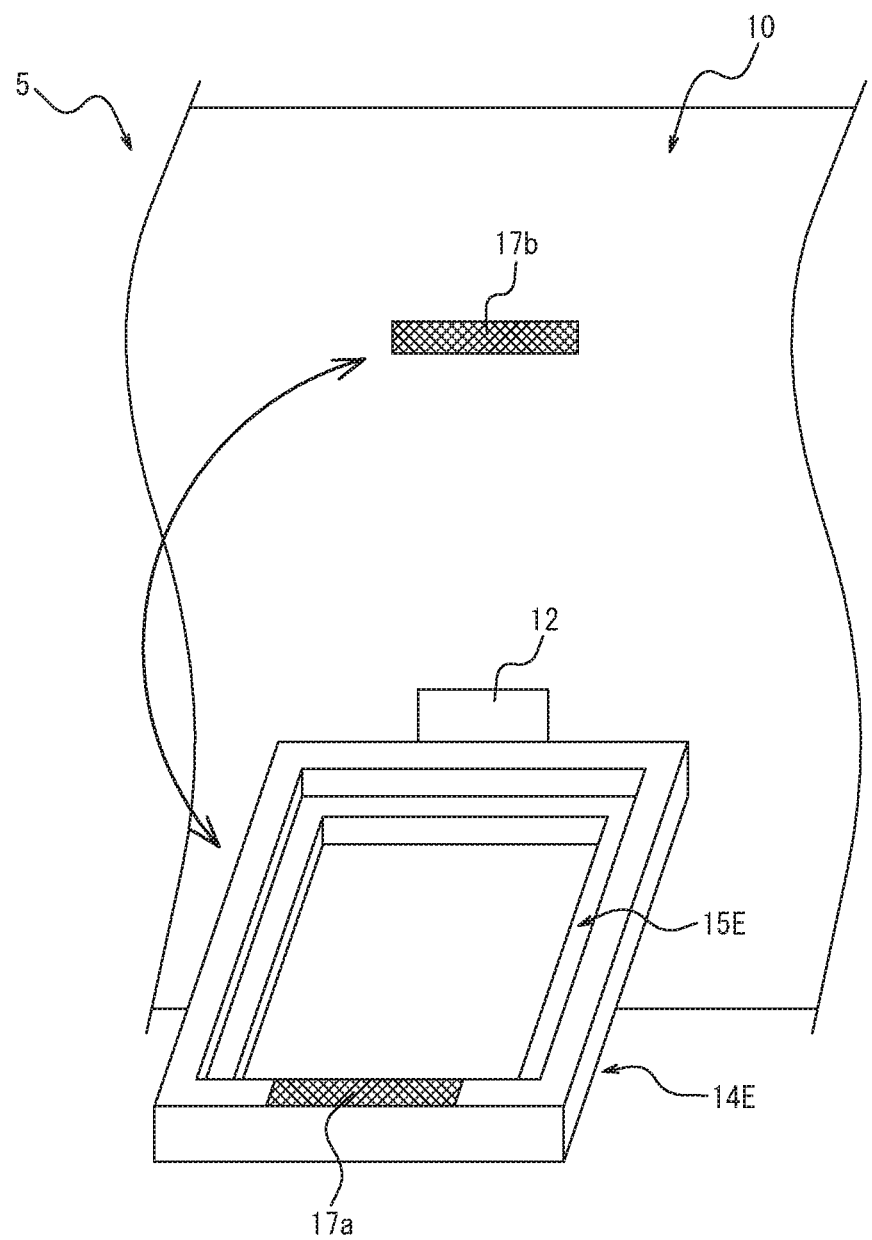
FIG. 7 is a partial plan view of the configuration of a power wiring apparatus 5 according to an embodiment of the present disclosure.

FIG. 7 is a schematic diagram (plan view) of a power wiring apparatus 5 according to an embodiment of the present disclosure. The power wiring apparatus 5 is a modification to the power wiring apparatus 1 illustrated in FIGS. 1A, 1B and has a configuration close to that of the power wiring apparatus 1, except that the configuration of an edge holding member 14E differs from that of the edge holding member 14A of the power wiring apparatus 1. Accordingly, the following description focuses on the configuration of the edge holding member 14E.

The edge holding member 14E is provided in the area surrounding the external circuit element 20 in plan view of the wiring member 10, as illustrated in FIG. 7. The edge holding member 14E used in the power wiring apparatus 5 has substantially the same shape as the edge holding member 14A used in the power wiring apparatus 1. The edge holding member 14E is configured using a hinge member or the like, however, to be rotatable about an axis of rotation. A locking portion 17a, configured by Magic Tape® (Magic Tape is a registered trademark in Japan, other countries, or both) or the like, is formed on the edge holding member 14E at a position opposite the first connector 12. This locking portion 17a locks with a locking portion 17b formed on the upper surface on the wiring member 10 side, enabling the edge holding member 14E to be fixed to the wiring member 10 side. The user attaches the second connector 21 of the external circuit element 20 to the first connector 12 on the wiring member 10 side and then rotates the edge holding member 14E about the axis of rotation to lock the locking portion 17a on the edge holding member 14E to the locking portion 17b on the wiring member 10 side. Displacement of the four edges of the external circuit element 20 in the thickness direction is thereby restricted by the housing 15E on the edge holding member 14E side, as in the power wiring apparatus 1. Accordingly, even when the power wiring apparatus 5 is carried with the external circuit element 20 attached to the wiring member 10, the external circuit element 20 and the wiring member 10 can be stably held in a parallel state so that the external circuit element 20 does not separate from the upper surface of the wiring member 10. Furthermore, it is not necessary to insert the external circuit element 20 by sliding the edges thereof in the housing 15E of the power wiring apparatus 5. This prevents the attachment or detachment of the external circuit element 20 from being obstructed due to friction or the like between the edges of the external circuit element 20 and the housing 15E.

[Configuration of Power Wiring Apparatus 6]

Figure 8:
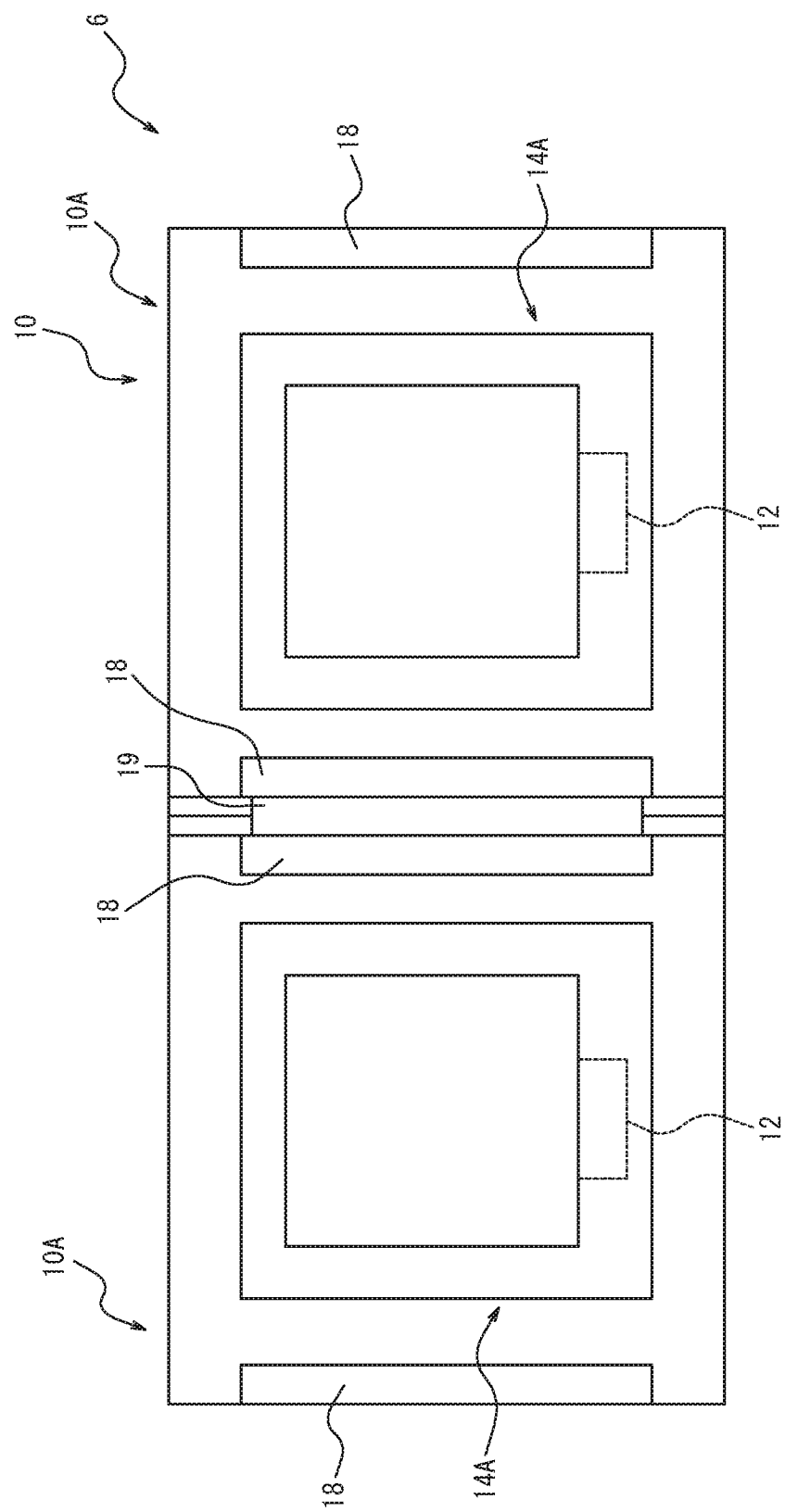
FIG. 8 is a plan view of the configuration of a power wiring apparatus 6 according to an embodiment of the present disclosure.

FIG. 8 is a schematic diagram of a power wiring apparatus 6 according to an embodiment of the present disclosure. The power wiring apparatus 6 is a modification to the power wiring apparatus 1 illustrated in FIGS. 1A, 1B and has a configuration close to that of the power wiring apparatus 1, except that the wiring member 10 includes two wiring member units 10A, and the wiring member units 10A are configured to be mechanically and electrically attachable and detachable via fourth connectors 18. Accordingly, the following description focuses on the differences from the power wiring apparatus 1.

As illustrated in FIG. 8, the wiring member 10 of the power wiring apparatus 6 includes two wiring member units 10A. Each wiring member unit 10A includes one first connector 12 and one edge holding member 14A. Two fourth connectors 18 are disposed on each wiring member unit 10A. The fourth connectors 18 form a connection wiring member that mechanically and electrically connects the wiring member units 10A to each other. The connection wiring member is conductively connected to the wiring member units 10A and has boundaries between the wiring member units 10A and the connection wiring member. In other words, the connection wiring member is configured as a separate member from the wiring member unit 10A. Inside the wiring member unit 10A, two fourth connectors 18 and the first connector 12 are electrically connected to each other via a conductive portion. One fourth connector 18 is provided at each of the left and right edges of each wiring member unit 10A. The two fourth connectors 18 that face each other when two wiring member units 10A are placed side-by-side in the left-right direction, as illustrated in FIG. 8, are configured to be mechanically and electrically attachable and detachable. This configuration can be implemented as illustrated in FIG. 8, with the fourth connectors 18 each being female connectors connected by a flexible printed circuit board 19 that has a male connector on each side. In this case, the connection wiring member is configured by the fourth connectors 18 and the flexible printed circuit board 19. In the above configuration, the opposing fourth connectors 18 may be connected directly by configuring one as a male connector and the other as a female connector. The connection wiring member is configured by a pair of fourth connectors 18 in this case. The number of first connectors 12 and edge holding members 14A included in each wiring member unit 10A is not limited to one and may instead be greater than one. The number of fourth connectors 18 disposed on each wiring member unit 10A is also not limited to two and may instead be one, or three or more.

The above configuration enables the power wiring apparatus 6 to be expanded by wiring member units 10A, enabling the overall size of the power wiring apparatus 6 to be freely adjusted in accordance with the user's usage conditions or the like. Furthermore, in the configuration of FIG. 8 in which facing fourth connectors 18 are connected to each other by the flexible printed circuit board 19, the power wiring apparatus 6 can be folded while the wiring member units 10A are still connected to each other. This increases the portability of the power wiring apparatus 6.

The number of first connectors 12 provided in each wiring member unit 10A is not limited to one; two or more first connectors 12 may be provided in each wiring member unit 10A. The arrangement of the fourth connectors 18 is not limited to the above embodiment, either. For example, fourth connectors 18 may be disposed at the top and bottom edges in FIG. 8 in addition to the left and right edges of the wiring member unit 10A. This enables the wiring member unit 10A to be attached and detached mechanically and electrically in the up-down direction of FIG. 8 as well as the left-right direction, thereby enabling the wiring member units 10A to be connected in a matrix to adjust the size of the power wiring apparatus 6.

The power wiring apparatus 6 is configured so that the wiring member units 10A are connected by the connection wiring member that includes the fourth connectors 18, but this configuration is not limiting. The wiring member units 10A and the connection wiring member may be configured integrally using a circuit board or the like in which a rigid board and a flexible printed circuit board are integrated, for example. In other words, each wiring member unit 10A may be configured by a rigid board, the connection wiring member may be configured by a flexible printed circuit board, and the rigid boards and flexible printed circuit board may be integrated.

[Configuration of Power Wiring Apparatus 7]

Figure 9:
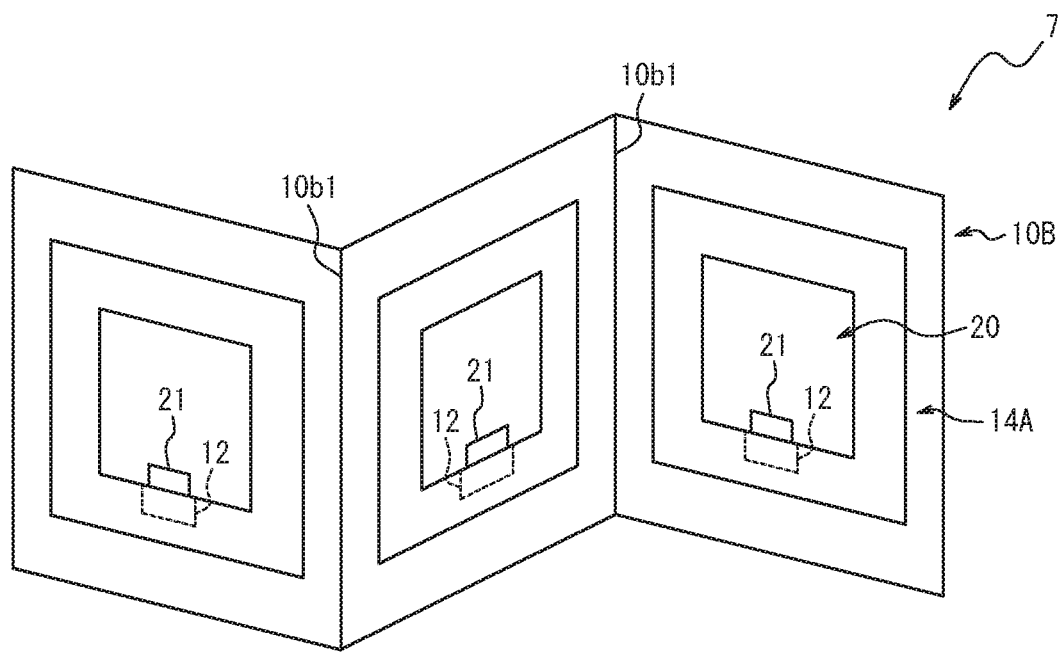
FIG. 9 is a perspective view of the configuration of a power wiring apparatus 7 according to an embodiment of the present disclosure.

FIG. 9 is a schematic diagram of a power wiring apparatus 7 according to an embodiment of the present disclosure. The power wiring apparatus 7 is a modification to the power wiring apparatus 1 illustrated in FIGS. 1A, 1B. A wiring member 10B includes three first connectors 12, and the wiring member 10B is configured to be bendable at a bending position 10*b*1 where the external circuit element 20 is not disposed. The remaining configuration resembles the configuration of the power wiring apparatus 1.

In greater detail, the wiring member 10B has a rectangular shape elongated in the left-right direction, with three first connectors 12 arranged at substantially equal intervals in the left-right direction. The bending position 10*b*1 extending in the up-down direction is defined at an in-plane position, between adjacent first connectors 12, where the external circuit elements 20 are not disposed when mounted on the first connectors 12. The wiring member 10B can be bent at the bending positions 10*b*1 so that mountain folds and valley folds alternate.

The configuration of the power wiring apparatus 7 can be achieved by, for example, forming the wiring member 10B as a flexible printed circuit board, providing a reinforcing plate in the area where the external circuit element 20 is disposed to ensure rigidity of the wiring member 10B, and not providing a reinforcing plate at the bending position 10*b*1 to ensure flexibility. The configuration of the power wiring apparatus 7 may also be achieved by using a circuit board in which a rigid board and a flexible printed circuit board are integrated and arranging the flexible printed circuit board at the bending position 10*b*1. The configuration of the power wiring apparatus 7 enables bending of the area where the external circuit element 20 is not disposed. Accordingly, this configuration enables the power wiring apparatus 7 to be folded while the external circuit element 20 is attached, thereby increasing the portability of the power wiring apparatus 7.

[Configuration of Power Wiring Apparatus 8]

Figure 10:
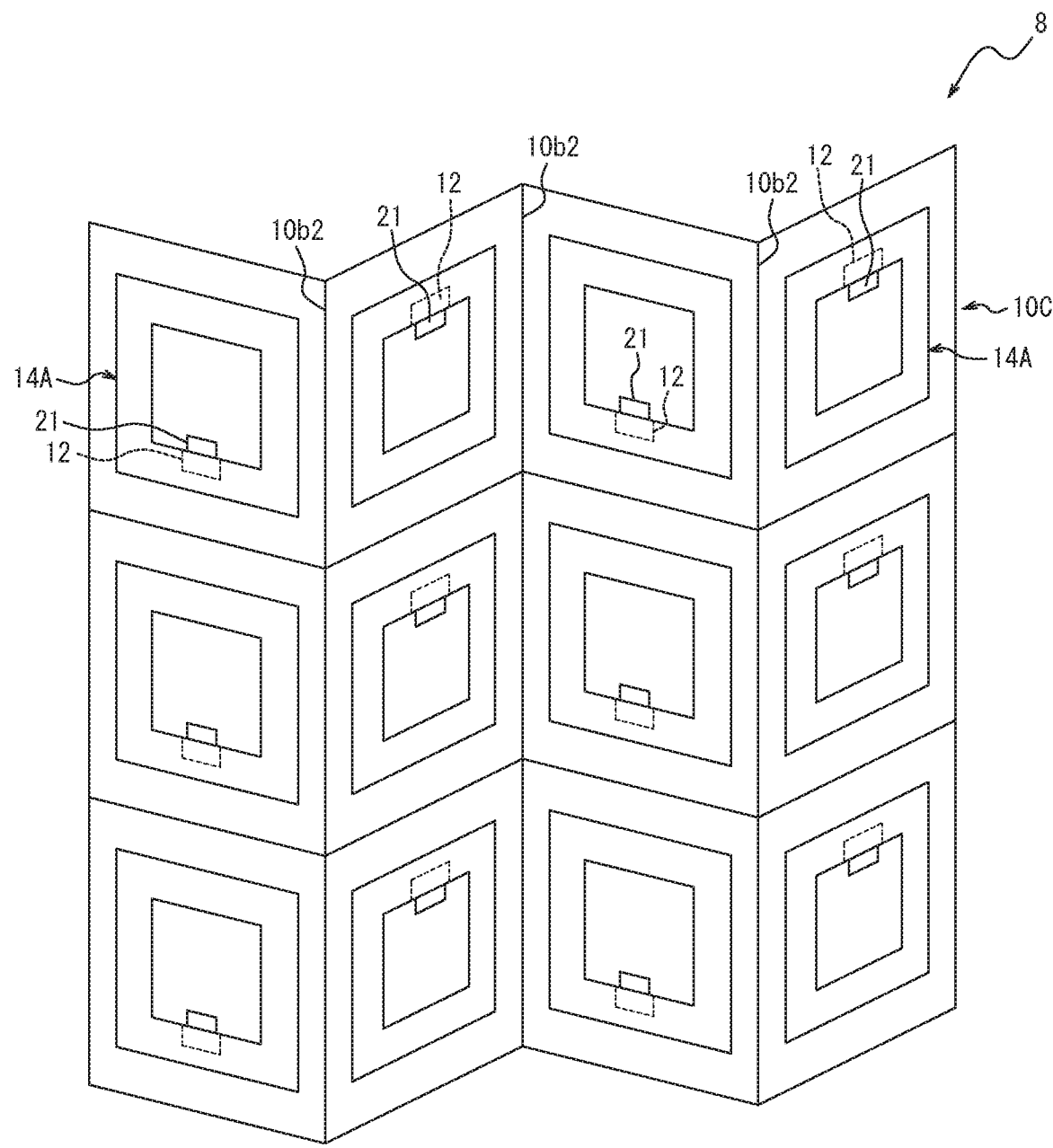
FIG. 10 is a perspective view of the configuration of a power wiring apparatus 8 according to an embodiment of the present disclosure.

FIG. 10 is a schematic diagram (perspective view) of a power wiring apparatus 8 according to an embodiment of the present disclosure. The power wiring apparatus 8 is a modification to the power wiring apparatus 1 illustrated in FIGS. 1A, 1B. Four first connectors 12 in the left-right direction and three in the up-down direction of FIG. 10 are arranged in a matrix on the upper surface of a wiring member 10C, for a total of 12 first connectors 12. A bending position 10*b*2 extending in the up-down direction of FIG. 10 is defined at an in-plane position, between two first connectors 12 adjacent in the left-right direction, where no external circuit element 20 is disposed. Two first connectors 12 adjacent in the left-right direction in FIG. 10 are arranged so that one is rotated 180 degrees relative to the other about a central axis perpendicular to the surface direction of the wiring member 10C. Accordingly, when the user bends the wiring member 10C at the bending positions 10b2 so that mountain folds and valley folds alternate, first connectors 12 opposite each other do not completely overlap but rather are separated in the up-down direction of FIG. 10 substantially by the vertical length of the external circuit element 20. In other words, two first connectors 12 adjacent to a bending position 10b2 are disposed at in-plane positions that do not overlap each other in the surface direction when the wiring member 10C is bent at the bending position 10b2. Accordingly, the thickness in the direction of overlap when the power wiring apparatus 8 is bent can be reduced, thereby increasing the portability of the power wiring apparatus 8.

The configuration of the power wiring apparatus 8 can be achieved by, for example, forming the wiring member 10C as a flexible printed circuit board, providing a reinforcing plate in the area where the external circuit element 20 is disposed to ensure rigidity of the wiring member 10C, and not providing a reinforcing plate at the bending position 10b2. The configuration of the power wiring apparatus 8 may also be achieved by using a circuit board in which a rigid board and a flexible printed circuit board are integrated and arranging the flexible printed circuit board at the bending position 10b2.

The case of bending in one dimension along the column direction is illustrated in FIG. 10, but the power wiring apparatus 8 may be bent in two dimensions along the row and column directions.

As described above, the power wiring apparatus 1 of the present embodiment includes a plate-shaped, flat wiring member 10, which includes a plurality of first connectors 12 and is configured to conductively connect the plurality of first connectors 12 to each other, and a plate-shaped external circuit element 20 mounted on the wiring member 10 and including a second connector 21 mechanically and electrically attachable to and detachable from any first connector 12 among the plurality of first connectors 12. The insertion and removal direction of the second connector 21 with respect to the first connector 12 is substantially parallel to the surface direction of the external circuit element 20. The external circuit element 20 includes an energy harvesting element as a circuit element capable of outputting, from the second connector 21, power generated by energy harvesting. This configuration enables the external circuit element 20 with the energy harvesting element mounted thereon to be carried while attached to the wiring member 10. This enables the power wiring apparatus 1 to be moved to a location with high power generation efficiency, thereby suppressing a reduction in power generation efficiency due to the external environment. In particular, the insertion and removal direction of the second connector 21 is substantially parallel to the surface direction of the external circuit element 20 in the present embodiment. This enables the second connector 21 to be inserted or removed by exerting a force in the surface direction of the thin external circuit element 20, thereby reducing the likelihood of bending stress when the external circuit element 20 is attached or detached. Accordingly, the stress on each member when the second connector 21 is attached to the first connector 12 can be reduced.

In the present embodiment, the wiring member 10 is configured as a flexible member. This configuration allows the power wiring apparatus 1 to be deformed for easier storage and carrying.

In the present embodiment, the wiring member 10 is configured to include the edge holding member 14A that holds the external circuit element 20 on the wiring member 10 by restricting displacement of the external circuit element 20 in the thickness direction at the edges of the external circuit element 20. This configuration allows the external circuit element 20 to be held without separating from the wiring member 10. When the power wiring apparatus 1 is carried with the external circuit element 20 attached to the wiring member 10, this configuration can therefore prevent the external circuit element 20 from separating from the wiring member 10 and deforming and can suppress damage caused by excessive stress.

The edge holding member 14A in the present embodiment includes the housing 15A that houses the edges along the insertion and removal direction of the second connector 21. The edge holding member 14A is configured to position the second connector 21 to be attachable to the first connector 12 by the edges being housed in the housing 15A with the second connector 21 facing the first connector 12. This configuration enables the external circuit element 20 to be moved in parallel with the wiring member 10 for easy attachment of the second connector 21 to the first connector 12. Furthermore, the stress on each member when the second connector 21 is attached to the first connector 12 can be reduced.

The external circuit element 20 of the present embodiment is configured to include a load element as a circuit element capable of consuming power inputted from the second connector 21. This configuration enables the power generated by the energy harvesting element in the power wiring apparatus 1 to be consumed by the load element.

The wiring member 10 in the present embodiment includes a plurality of wiring member units 10A each including the first connector 12, and the plurality of wiring member units 10A are mechanically and electrically connected via a connection wiring member. This configuration enables the power wiring apparatus 6 to be folded in the area of the connection wiring member, making the power wiring apparatus 6 easier to store and carry.

The connection wiring member of the present embodiment includes fourth connectors 18 disposed on the plurality of wiring member units 10A, and the plurality of wiring member units 10A are mechanically and electrically connected by the fourth connectors 18 being connected to each other directly or via another member. This configuration enables the power wiring apparatus 6 to be expanded by wiring member units 10A, enabling the overall size of the power wiring apparatus 6 to be freely adjusted in accordance with the user's usage conditions or the like.

In the present embodiment, the wiring members 10B, 10C are bendable at an in-plane position where the external circuit element 20 is not disposed. This configuration enables the power wiring apparatuses 7, 8 to be folded while the external circuit element 20 is attached, thereby increasing the portability of the power wiring apparatuses 7, 8.

In the present embodiment, two first connectors 12 adjacent to a bending position 10b2 are disposed at in-plane positions that do not overlap each other in the surface direction when the wiring member 10C is bent at the bending position 10b2. This configuration can reduce the thickness in the direction of overlap when the power wiring apparatus 8 is bent, thereby further increasing the portability of the power wiring apparatus 8.

While the disclosed apparatus has been described by way of the drawings and embodiments, various changes or modifications may be made by those of ordinary skill in the art based on the present disclosure. Such changes or modifications are therefore included in the scope of the present disclosure. For example, the functions and the like included in the components may be rearranged in any logically consistent way, a plurality of components may be combined into one, and a single component may be divided into a plurality of components. These configurations are also included in the scope of the present disclosure.

For example, the power wiring apparatuses 1 to 8 can be freely combined. The edge holding members 14B through 14E in the power wiring apparatuses 2 to 5, for example, can be replaced by the edge holding member 14A of the power wiring apparatuses 1 and 6 to 8 of FIGS. 1A, 1B, and 8 to 10. The configuration of the fourth connectors 18 and the flexible printed circuit board 19 of FIG. 8 may be adopted in the configuration of the bending positions 10*b*1, 10*b*2 in the power wiring apparatuses 7, 8.

It suffices for the above-described connectors to be combined to be attachable to and detachable from each other. One connector may be male and the other female, for example. When the first connector 12 is a male connector, the second connector 21 that is attachable to and detachable from the first connector 12 is a female connector. Conversely, when the first connector 12 is a female connector, the second connector 21 that is attachable to and detachable from the first connector 12 is a male connector. When the third connector 13 is a male connector, another non-illustrated connector that is attachable to and detachable from the third connector 13 is a female connector. Conversely, when the third connector 13 is a female connector, another non-illustrated connector that is attachable to and detachable from the third connector 13 is a male connector.

The energy harvesting element need not include the reverse current prevention unit. The energy harvesting element preferably includes the reverse current prevention unit, however, so that current from circuit elements such as other energy harvesting elements can be prevented from flowing into the energy harvesting unit or into an external energy harvesting unit. The energy harvesting element preferably includes a voltage controller to control the output voltage to be constant.

In this way, the power wiring apparatuses 1 to 8 according to the present embodiment are reduced in size mainly for carrying solar cells. The power wiring apparatuses 1 to 8 are highly portable, making the amount of power generated in one solar cell small. It is therefore advantageous to include a plurality of solar cells. Inclusion of a plurality of solar cells increases the apparatus area. To reduce the effect of increased area on portability, the present embodiment enables a plurality of wiring member units 10A to be attached and detached in accordance with the user's usage conditions and enables the wiring member 10 to be folded easily.

INDUSTRIAL APPLICABILITY

The present disclosure can provide a power wiring apparatus that has improved portability and improved convenience.

REFERENCE SIGNS LIST

1, 2, 3, 4, 5, 6, 7, 8 Power wiring apparatus
10, 10B, 10C Wiring member
10A Wiring member unit
10*b*1, 10*b*2 Bending position
11A Board body
11B Conductive portion
12 First connector
13 Third connector
14A, 14B, 14C, 14D, 14E Edge holding member
14A1, 14B1, 14C1 Opening
15A, 15B, 15C, 15D, 15E Housing
17*a*, 17*b* Locking portion
18 Fourth connector (connection wiring member)
19 Flexible printed circuit board (connection wiring member)
20 External circuit element
21 Second connector
30 Hole
32 Folding line
41 Mounting area
43 Connection area (connection wiring member)

The invention claimed is:

1. A power wiring apparatus comprising:
a plate-shaped wiring member comprising a plurality of first connectors and configured to conductively connect the plurality of first connectors to each other; and
a plate-shaped external circuit element mounted on the wiring member and comprising a second connector mechanically and electrically attachable to and detachable from any first connector among the plurality of first connectors;
wherein an insertion and removal direction of the second connector with respect to the first connector is substantially parallel to a surface direction of the external circuit element; and
wherein the external circuit element comprises an energy harvesting element as a circuit element capable of outputting, from the second connector, power generated by energy harvesting.

2. The power wiring apparatus of claim 1, wherein the wiring member is flexible.

3. The power wiring apparatus of claim 2, wherein the wiring member comprises an edge holding member configured to hold the external circuit element on the wiring member by restricting displacement of the external circuit element in a thickness direction at an edge of the external circuit element.

4. The power wiring apparatus of any one of claim 2, wherein the external circuit element comprises a load element as a circuit element capable of consuming power inputted from the second connector.

5. The power wiring apparatus of any one of claim 2, wherein the wiring member comprises a plurality of wiring member units configured to include the first connector, and the plurality of wiring member units are mechanically and electrically connected via a connection wiring member.

6. The power wiring apparatus of any one of claim 2, wherein the wiring member is bendable at a bending position where the external circuit element is not disposed.

7. The power wiring apparatus of claim 1, wherein the wiring member comprises an edge holding member configured to hold the external circuit element on the wiring member by restricting displacement of the external circuit element in a thickness direction at an edge of the external circuit element.

8. The power wiring apparatus of claim 7, wherein the edge holding member comprises a housing configured to house the edge along the insertion and removal direction of the second connector, and the second connector is positioned to be attachable to the first connector by the edge being housed in the housing with the second connector facing the first connector.

9. The power wiring apparatus of any one of claim 8, wherein the external circuit element comprises a load element as a circuit element capable of consuming power inputted from the second connector.

10. The power wiring apparatus of any one of claim 8, wherein the wiring member comprises a plurality of wiring member units configured to include the first connector, and the plurality of wiring member units are mechanically and electrically connected via a connection wiring member.

11. The power wiring apparatus of any one of claim 8, wherein the wiring member is bendable at a bending position where the external circuit element is not disposed.

12. The power wiring apparatus of any one of claim 7, wherein the external circuit element comprises a load element as a circuit element capable of consuming power inputted from the second connector.

13. The power wiring apparatus of any one of claim 7, wherein the wiring member comprises a plurality of wiring member units configured to include the first connector, and the plurality of wiring member units are mechanically and electrically connected via a connection wiring member.

14. The power wiring apparatus of any one of claim 7, wherein the wiring member is bendable at a bending position where the external circuit element is not disposed.

15. The power wiring apparatus of claim 1, wherein the external circuit element comprises a load element as a circuit element capable of consuming power inputted from the second connector.

16. The power wiring apparatus of any one of claim 15, wherein the wiring member comprises a plurality of wiring member units configured to include the first connector, and the plurality of wiring member units are mechanically and electrically connected via a connection wiring member.

17. The power wiring apparatus of claim 1, wherein the wiring member comprises a plurality of wiring member units configured to include the first connector, and the plurality of wiring member units are mechanically and electrically connected via a connection wiring member.

18. The power wiring apparatus of claim 17, wherein the connection wiring member comprises fourth connectors disposed on the plurality of wiring member units, and the plurality of wiring member units are mechanically and electrically connected by the fourth connectors being connected to each other directly or via another member.

19. The power wiring apparatus of claim 1, wherein the wiring member is bendable at a bending position where the external circuit element is not disposed.

20. The power wiring apparatus of claim 19, wherein two first connectors adjacent to the bending position are disposed at in-plane positions that do not overlap each other in the surface direction when the wiring member is bent at the bending position.

* * * * *